United States Patent [19]
Tanahashi et al.

[11] Patent Number: 4,822,073
[45] Date of Patent: Apr. 18, 1989

[54] FRONT SUSPENSION FOR A VEHICLE

[75] Inventors: Haruhiko Tanahashi, Toyota, Japan; Noritoshi Arai, Brussels, Belgium

[73] Assignee: Toyota Jidosha Kabushiki Kaisha, Aichi, Japan

[21] Appl. No.: 169,986

[22] Filed: Mar. 18, 1988

[30] Foreign Application Priority Data

Mar. 24, 1987 [JP] Japan .................. 62-070015

[51] Int. Cl.⁴ .................................. B62D 7/16
[52] U.S. Cl. ........................ 280/673; 280/691
[58] Field of Search ........... 280/660, 663, 666, 673, 280/675, 691, 696

[56] References Cited

U.S. PATENT DOCUMENTS

| | | | |
|---|---|---|---|
| 3,520,554 | 7/1970 | Ravenel | 280/673 |
| 4,059,286 | 11/1977 | Otto et al. | 280/673 |
| 4,139,246 | 2/1979 | Mikoshiba et al. | 280/673 |
| 4,448,441 | 5/1984 | Brummer et al. | 280/675 |
| 4,591,184 | 5/1986 | Matschinsky | 280/673 |
| 4,717,175 | 1/1988 | Arai et al. | 280/673 |

FOREIGN PATENT DOCUMENTS

3331282 3/1985 Fed. Rep. of Germany .
1566632 5/1980 United Kingdom .

*Primary Examiner*—David M. Mitchell
*Assistant Examiner*—Ross Weaver
*Attorney, Agent, or Firm*—Parkhurst, Oliff & Berridge

[57] ABSTRACT

In a vehicle front suspension of the type wherein a control arm is vertically pivotally mounted to a vehicle body at two inboard end portions thereof spaced apart substantially in the vehicle longitudinal direction through respectively a front and a rear elastic linkage bearing and is horizontally pivotably connected at an outboard end portion thereof with a wheel support member bearing a knuckle arm extending rearwardly and rotatably supporting a vehicle wheel, and the free end of the knuckle arm is pivotally connected with an end portion of a tie rod for steering of the vehicle, the rear elastic linkage bearing is constructed to exhibit non-linear spring characteristics such as to exhibit a first spring constant with respect to force acting thereto in a vehicle lateral direction and not exceeding a certain value and a second spring constant which is lower than said first spring constant with respect to the lateral force exceeding said certain value, and the first spring constant of the rear elastic linkage bearing and the spring constant of the front elastic linkage bearing with respect to force acting thereto in the vehicle lateral direction are set such that the instantaneous center of pivoting of the vehicle wheel support member and the control arm together in the vehicle longitudinal direction is positioned to the rear of the axis of the tie rod.

10 Claims, 10 Drawing Sheets

FRONT SUSPENSION FOR A VEHICLE

BACKGROUND OF THE INVENTION

1. Field of the Invention

The present invention relates to a vehicle suspension for an automobile or the like, and more particularly to a front suspension for a vehicle.

2. Description of the Prior Art

In a vehicle such as an automobile there is a well known phenomenon termed "flutter" in which the suspension and steering systems resonate because of non-uniformity and unbalance in the vehicle wheels. The flutter is perceived by the driver as a rotational oscillation of the steering wheel. Also is well known another phenomenon termed "harshness" in which the wheel tire is given a bump by a seam in the pavement of the road or the like and the suspension and steering systems are percussively driven to turn rearward, with a simultaneous generation of unpleasant crashing sound and also a shock perceptible at the steering wheel and the seat.

The construction described in U.S. Pat. No. 4,448,441 is known as one means of reducing flutter in a strut type front suspension including an L type arm or A type arm, in other words a suspension having a vehicle wheel support member which supports rotatably a vehicle wheel, a control arm which at its inboard end is pivotally attached to the vehicle body at two coupling portions spaced apart substantially in the vehicle longitudinal direction with elastic linkage bearings interposed at front and rear and at its outboard end is pivotally attached to the vehicle wheel support member, a strut which at its lower end is coupled to the vehicle wheel support member and at its upper end is pivotally attached to the vehicle body and a knuckle arm which is provided integrally with the vehicle wheel support member and is pivotally attached to a tie rod at a position to the rear of the pivot point of the vehicle wheel support member and the control arm. In this U.S. Pat. No. as shown in FIG. 1 and FIG. 3 therein, the axis (54) joining the upper support (42) and the center (58) of oscillating movement in the longitudinal direction of the control arm either passes close to the axis (49) of the tie rod or intersects the axis of the tie rod, whereby vibration of the tie rod along its axis due to vibration in the vehicle longitudinal direction of the control arm is reduced or prevented, as a means of reducing or preventing flutter.

In the case of the above mentioned U.S. Pat. No. in order that the axis (54) joining the center of motion in the vehicle longitudinal direction of the control arm with the upper support is close to the axis (49) of the tie rod or intersects with that axis, it is necessary that: [1] the spring constant of the front elastic linkage bearing is made substantially equal to the spring constant of the rear elastic linkage bearing. Furthermore, [2] in order to improve the steering stability it is necessary to make the front elastic linkage bearing harder in order to increase the lateral rigidity of the suspension; and [3] in order to reduce harshness it is necessary to make the rear elastic linkage bearing softer. It is not possible for [1], [2] and [3] to hold at the same time, so with the construction described in the above mentioned U.S. Pat. No. it is not possible simultaneously to reduce flutter, reduce harshness and improve steering ability.

Furthermore, in the construction described in the above mentioned U.S. Pat. No. the assumption is made that even in the event of flutter the vehicle wheel support member and knuckle arm do not move horizontally about the kingpin axis and also that the pivot point between the knuckle arm and the tie rod moves only about the axis 54; thus with the construction described in the above mentioned U.S. Pat. No. there is the problem that effective reduction or elimination of flutter cannot necessarily be obtained.

SUMMARY OF THE INVENTION

The present invention considers the above mentioned problems with the constructon of the above mentioned U.S. Pat. No., and bearing in mind the substantial difference between the cases of flutter and harshness in the force acting on the rear elastic linkage bearing in the vehicle transverse direction due to the load acting on the vehicle wheel in the vehicle longitudinal direction, has as its object the provision of an improved front suspension of a vehicle such that without sacrificing steering stability both flutter and harshness can be effectively reduced.

The above object is achieved, according to the present invention, by a front suspension for a vehicle, including a vehicle wheel support member supporting rotatably a vehicle wheel, a control arm connected with a vehicle body at two inboard end portions thereof spaced apart substantially in a longitudinal direction of the vehicle to be vertically pivotable therearound relative to the vehicle body and connected with said wheel support member at an outboard end portion thereof to be horizontally pivotable therearound relative to said wheel support member, a front and a rear elastic linkage bearing incorporated in the connecting portions between said two inboard end portions of said control arm and said vehicle body, a knuckle arm integrally connected at one end thereof with said vehicle wheel support member and extending rearwardly of the vehicle therefrom to a free end portion thereof, and a tie rod pivotally connected at one end thereof with said free end portion of said knuckle arm, characterized in that said rear elastic linkage bearing has non-linear spring characteristics such as to exhibit a first spring constant with respect to force acting thereto in a vehicle lateral direction at a value not exceeding a certain value and a second spring constant which is lower than said first spring constant with respect to said lateral force exceeding said certain value, and in that said first spring constant of said rear elastic linkage bearing and the spring constant of said front elastic linkage bearing with respect to force acting thereto in the vehicle lateral direction are set such that the instantaneous center of pivoting of said vehicle wheel support member and said control arm together in the vehicle longitudinal direction is positioned to the rear of the axis of said tie rod.

In the front suspension of a vehicle such as an automobile generally when a load in the vehicle longitudinal direction is input to the vehicle wheel, the center L (later referred to with reference to FIG. 1, etc.. Same about D, D1, D2, P, O1 and O2 hereinunder) of the pivot point of the knuckle arm and tie rod is displaced by a total amount D which is the sum of a displacement D1 of the control arm and vehicle wheel support member together about the instantaneous center O1, and a displacement D2 centered on the center P (in three dimensional terms the kingpin axis) of the pivot between the control arm and the vehicle wheel support member. Therefore, in order to reduce flutter, the instantaneous center O1 may be determined so that as far as possible the direction of the sum of these displacements D is perpendicular to the axis of the tie rod. Moreover in the event of flutter the load acting in the vehicle longitudinal direction on the vehicle wheel is relatively small, at most approximately 10 kg, whereas in the event of harshness, the load is relatively large at approximately 100 kg. In both of these cases the loads act on the rear elastic linkage bearing including a component in the vehicle lateral direction.

According to the present invention, the rear elastic linkage bearing exhibits non-linear spring characteristics such that it has a first spring constant with respect to a force acting in the vehicle lateral direction not exceeding a certain value, and has a second spring constant lower than the spring constant of the front elastic linkage bearing with respect to a force in the vehicle lateral direction exceeding that certain value, and the spring constant in the vehicle lateral direction of the front elastic linkage bearing and the first spring constant of the rear elastic linkage bearing are so determined that the instantaneous center of pivoting in the vehicle longitudinal direction of the vehicle wheel support member and the control arm together is positioned to the rear of the axis of the tie rod.

Therefore as described below in more detail with reference to the drawings, in the case of flutter, when the load acting on the vehicle wheel in the vehicle longitudinal direction is relatively small, the rear elastic linkage bearing exhibits a first spring constant and the instantaneous center O1 of the control arm and vehicle wheel support member together is positioned to the rear of the axis of the tie rod, as a result of which the direction of the total displacement of the center L of the pivot point of the knuckle arm and the tie rod approaches the direction perpendicular to the axis of the tie rod, and the component of displacement of the tie rod along its axis is reduced so that flutter can be reduced. Moreover, in this case, the spring constant of the front elastic linkage bearing is maintained at a constant value, so that while obtaining the same effect as in the above mentioned case where the spring constant of the front elastic linkage bearing is reduced, the reduction of the rigidity of the suspension and the corresponding loss of steering stability is avoided.

Again, as described below in more detail with reference to the drawings, in the case of harshness where a relatively large force acts in the vehicle longitudinal direction on the vehicle wheel, the rear elastic linkage bearing exhibits the second spring constant which is lower than the spring constant of the front elastic linkage bearing, and the load acting in the vehicle longitudinal direction on the vehicle wheel can easily be absorbed by elastic deformation in the vehicle lateral direction of the rear elastic linkage bearing, so that harshness can be effectively be reduced.

According to one detailed characteristic of the front suspension according to the present invention, the first spring constant of the rear elastic linkage bearing is set to be substantially the same as or higher than the spring constant in the vehicle lateral direction of the front elastic linkage bearing. In cases where seen from above the vehicle the axis of the tie rod extends considerably forward of the center of the rear elastic linkage bearing, the first spring constant may be lower than the spring constant in the vehicle lateral direction of the front elastic linkage bearing.

According to another detailed characteristic of the front suspension according to the present invention, the rear elastic linkage bearing is constructed so that when the force acting in the vehicle lateral direction thereon is not more than a certain value the spring constant in the vehicle lateral direction is substantially infinitely large. In many vehicles such as automobiles, generally when the vehicle in forward straight line movement is seen in plan view the pivot point of the tie rod and knuckle arm is to the rear and inboard of the pivot point of the control arm and the vehicle wheel support member, and the tie rod is arranged to be inclined slightly to the rear from the end coupled to the knuckle arm toward the other end. Therefore, according to the above construction, the instantaneous center O1 is positioned on a phantom line in the vehicle lateral direction passing through the center of the rear elastic linkage bearing, and the direction of the total displacement D of the center L approximates even more closely to the direction perpendicular to the axis of the tie rod, whereby flutter can be further reduced and may be eliminated.

It should be noted that the present invention may be applied to any front suspension such as a strut type front suspension or a double wishbone type front suspension, which comprises a vehicle wheel support member which supports rotatably a vehicle wheel, a control arm which is pivotably attached to the vehicle body at two inboard ends which are spaced substantially in the longitudinal direction of the vehicle through a front and a rear elastic linkage bearing and is pivotally attached to the vehicle wheel support member at an outboard end portion, and a knuckle arm which is formed integrally with the vehicle wheel support member and is pivotally attached to the tie rod at a position to the rear of the pivot point of the vehicle wheel support member and the control arm, provided that the axis of the tie rod extends as seen from above the vehicle to the front of the center of the rear elastic linkage bearing. In particular when the present invention is applied to a double wishbone type front suspension and both the upper control arm and the lower control arm of the suspension are A type arms or L type arms, then it is preferable for both upper and lower control arms to have a rear elastic linkage bearing which has non-linear spring characteristics according to the present invention, but if the concept of the present invention is applied to the rear elastic linkage bearing of only one of the upper and lower control arms then it is preferable for the concept of the present invention to be applied to the rear elastic linkage bearing of the lower control arm.

BRIEF DESCRIPTION OF THE DRAWINGS

In the accompanying drawings.

DESCRIPTION OF THE PREFERRED EMBODIMENTS

The present invention is now described in detail with reference to the attached drawings and in terms of embodiments.

Figure 1:
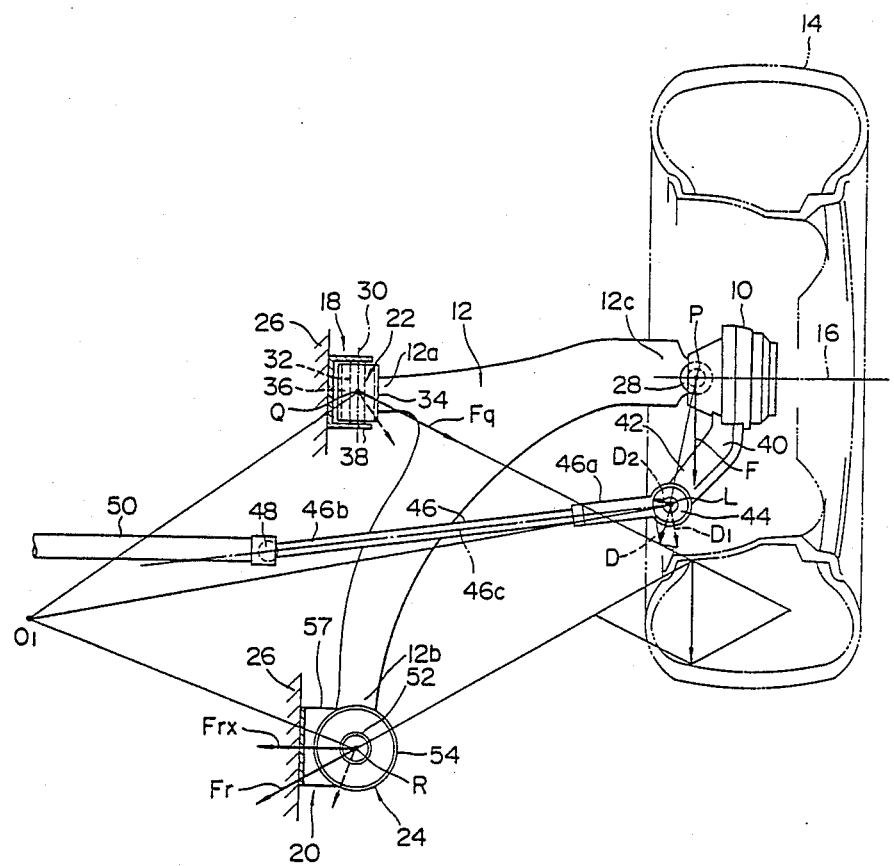
FIG. 1 and FIG. 2 are schematic plan views of one embodiment of the front suspension according to the present invention applied to a strut type front suspension also showing vectors indicating the forces acting on various constituents and the movements of various constituents in the respective cases of flutter and harshness.
Figure 2:
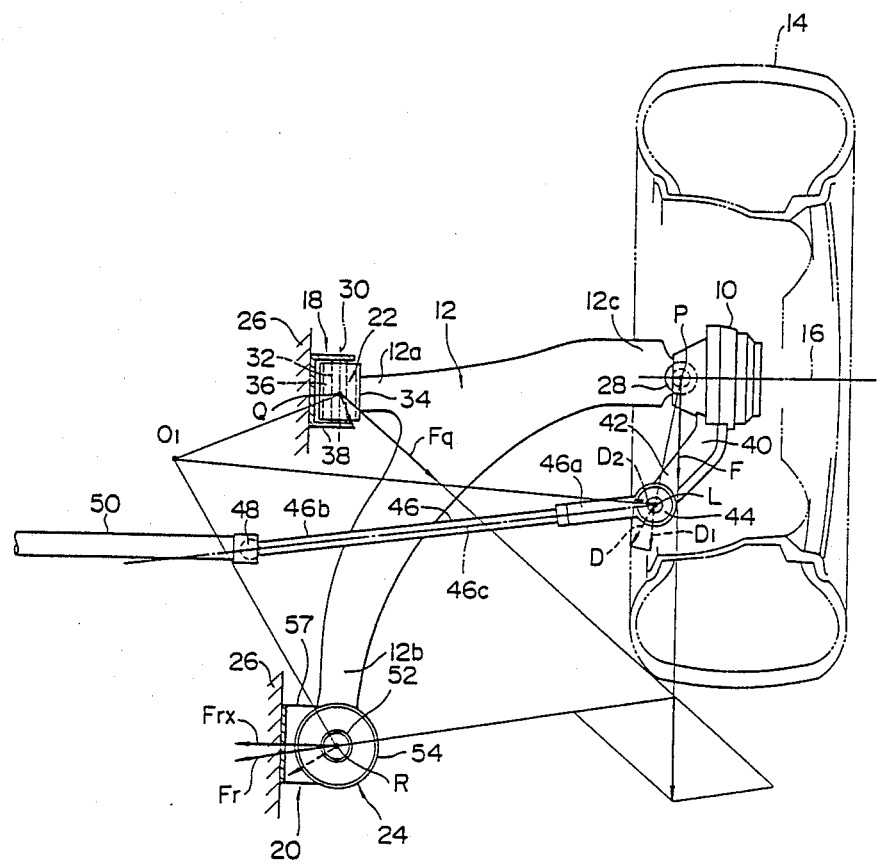

FIG. 1 and FIG. 2 are schematic diagrams of one embodiment of a front suspension according to the present invention applied to a strut type front suspension, also showing the vectors for the forces acting on various constituents and the movement of the constituents in the cases respectively of flutter and harshness. It should be noted that in FIG. 1 the vectors indicating the forces acting on various components and the movements of the components are exaggerated compared with those in FIG. 2.

In these drawings, 10 and 12 are respectively a vehicle wheel support member and a control arm. The vehicle wheel support member 10 supports a vehicle wheel 14 about an axis 16. In the embodiment shown in the drawing the control arm 12 is of an L type and is pivotally attached to a vehicle body 26 at two inboard end portions 12a and 12b displaced apart in the vehicle longitudinal direction by coupling portions 18 and 20 respectively through a front elastic linkage bearing 22 and a rear elastic linkage bearing 24, and at its outboard end portion 12c is pivotally attached to the vehicle wheel support member 10 by a ball joint 28 positioned below the axis 16.

As in the case of many strut type front suspension suspensions of conventional pattern including an L type control arm, the elastic linkage bearing 22 includes an inner tube 32 and outer tube 34 disposed coaxially with the axis 30 extending substantially in the vehicle wheel longitudinal direction, and between these a cylindrical rubber elastic body 36, and the outer tube is fixed to the front inboard end portion 12a of the control arm 12 and the inner tube is fixed to a (38) fixed to the vehicle body 26 by a bolt and nut not shown in the drawing. Moreover, in a well known fashion, the vehicle wheel support member 10 is coupled to the lower end of a strut not shown in the drawing and positioned above the axis 16 and the upper end of this strut is pivotally connected through an upper support to the vehicle body.

Furthermore, a knuckle arm 40 which projects outwards and extends toward the rear of the vehicle and in the inboard direction is provided integrally with the vehicle wheel support member 10. A tie rod 46 has one end 46a pivotally attached by a ball joint 44 to an end 42 of the knuckle arm 40, and the other end 46b of the tie rod is pivotally attached by a ball joint 48 by a steering member 50 such as a rack bar. In the embodiment shown in the drawing, as in most automobiles, the tie rod 46 is inclined very slightly to the rear of the vehicle looking in the direction from the first end 46a to the second end 46b and the axis 46c thereof extends, as seen from above the vehicle, between the center Q of the front elastic linkage bearing 22 and the center R of the rear elastic linkage bearing 24.

In the suspension of the present invention the tie rod may extend seen in the direction from the end 46a to the other end 46b substantially in the vehicle lateral direction, or may be inclined toward the front of the vehicle.

Figure 3:
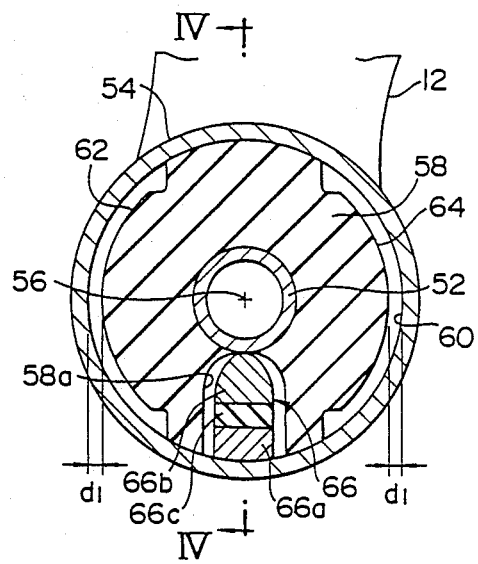
FIG. 3 is an enlarged plan sectional view of an elastic linkage bearing incorporated in the rear coupling portion at the inboard end of the control arm in the embodiment shown in FIG. 1 and FIG. 2.
Figure 4:
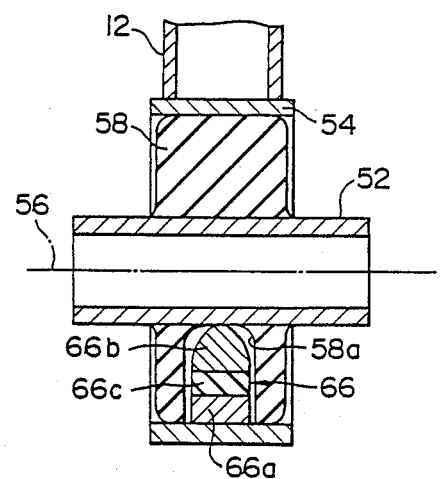
FIG. 4 is a section along the line IV—IV in FIG. 3.

FIG. 3 is an enlarged sectional drawing showing the elastic linkage bearing incorporated in the rear coupling portion of the inward end of the control arm of the embodiment shown in FIGS. 1 and 2, and FIG. 4 is a sectional drawing along line IV—IV of FIG. 3.

In these drawings 52 and 54 indicate an inner tube and outer tube respectively which are disposed coaxially with an axis 56 which intersects the axis 30 and extends substantially vertically. The inner tube 52 is fixed by a bolt and nut not shown in the drawing to a U-shaped bracket 57 which is fixed to the vehicle body 26 and has arms at the top and bottom of the elastic linkage bearing 24, and the outer tube 54 is fixed integrally to the rear inboard end portion 12b of the control arm 12. Between the inner and outer tubes is interposed a rubber elastic body 58 of lower spring constant than the rubber elastic body 36, and the rubber elastic body is fixed with adhesive on its inner surface to the outer surface of the inner tube excluding the portion in the direction of the rear of the vehicle with respect to the axis 56, while on its outer surface it abuts the inner surface 60 of the outer tube 54 only on the portions in the vehicle front and rear directions with respect to the axis 56. The outer surfaces 62 and 64 on the vehicle left and right directions of the rubber elastic body 58 are spaced apart from the inner surface 60 of the outer tube by a distance d1.

On the inner surface 60 of the outer tube is fixed an engaging lug 66 positioned to the rear of the axis 56. The engaging lug 56 comprises a rigid root portion 66a fixed to the inner surface of the outer tube, an end portion 66b of similarly rigid material and having a rounded end, and a central portion 66c of a rubber elastic material between the root portion and the end portion and fixed to them with adhesive. The engaging lug 66 is disposed within a recess 58a of the rubber elastic body 58 and is spaced apart from the wall thereof, and extends toward the axis 56. The spring constant of the intermediate portion 66c is set to be higher than the spring constant of the rubber elastic body 58, and when there is no relative force acting in the vehicle lateral direction between the inner and outer tubes, the round end of the engaging lug abuts the outer surface of the inner tube, and the engaging lug is subject to a pre-load in the longitudinal direction and is thus maintained in a compressed state between the inner and outer tubes.

Figure 5:
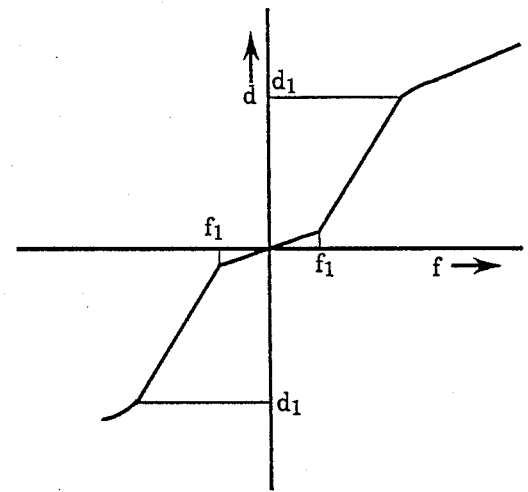
FIG. 5 is an explanatory graph showing the spring characteristics in the vehicle lateral direction of the elastic linkage bearing shown in FIG. 3 and FIG. 4.
Figure 7:
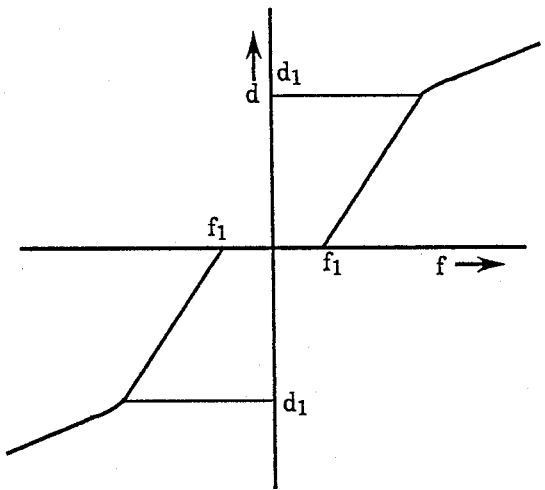
FIG. 7 is an explanatory graph similar to FIG. 5 showing the spring characteristics in the vehicle lateral direction of the elastic linkage bearing shown in FIG. 6.
Figure 14:
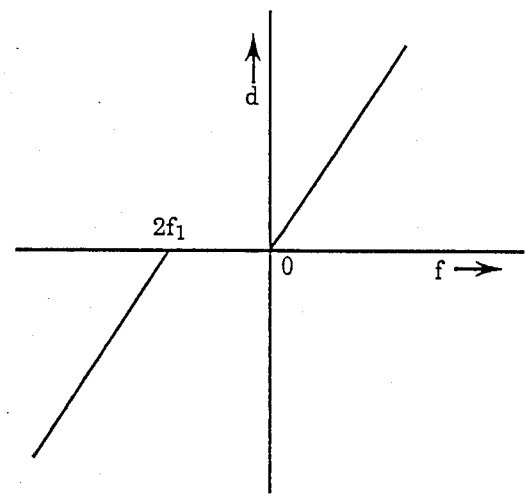
FIG. 14 is an explanatory graph showing the spring characteristics in the vehicle lateral direction in the free state in the embodiment shown in FIG. 12 and FIG. 13.

Next with reference to FIG. 5 the spring characteristics in the vehicle lateral direction of the elastic linkage bearing shown in FIGS. 3 and 4 are described. In FIG. 5 the horizontal axis indicates the force f acting in the vehicle lateral direction on the outer tube relative to the inner tube, and the vertical axis shows the relative displacement d in the vehicle lateral direction of the outer tube with respect to the inner tube (FIG. 7 and FIG. 14 below are similar).

When the force f is in the range not exceeding a certain value f1, the end of the engaging lug 66 and the outer surface of the inner tube are maintained in a state of contact by the static friction force acting between them, so that no relative displacement occurs, but a relatively high spring constant is produced principally by shear deformation of the intermediate portion 66c of the engaging lug and the portion of the rubber elastic body which is radially opposite to the engaging lug with respect to the inner tube, and thereby the relative displacement in the lateral direction of the outer tube with respect to the inner tube is restricted to a small value. When the force f exceeds the certain value f1, the force attempting to displace the end of the engaging lug 66 in a vehicle lateral direction overcomes the static friction force between the end of the engaging lug and the inner tube, and the engaging lug 66 is separated from the inner tube and the portions of the rubber elastic body 58 in the vehicle longitudinal direction begin to undergo elastic deformation (principally shear deformation) and thereby a relatively low spring constant is produced, so that the relative displacement of the outer tube with respect to the inner tube is increased. If the force further increases, the outer surface 62 or 64 of the rubber elastic body 58 contacts the inner surface of the outer tube, and a portion of the rubber elastic body in the vehicle lateral direction is compressed, whereby a relatively large spring constant is generated and the relative displacement of the outer tube with respect to the inner tube is decreased.

By appropriate determination of the surface characteristics of the end of the engaging lug and the outer surface of the inner tube and the pre-loading of the engaging lug the value f1 may be set to be larger than the force which acts on the outer tube 54 in the vehicle lateral direction relative to the inner tube as a result of the force acting on the vehicle wheel in the vehicle longitudinal direction in the case of flutter. The spring constants of the rubber elastic body of the front elastic linkage beaering 22 and the rubber elastic body 58 of the rear elastic linkage bearing 24 are determined such that in the range where the end of the engaging lug is maintained in the state of contacting the outer surface of the inner tube, the instantaneous center of pivoting O1 in the vehicle longitudinal direction of the control arm 12 and the vehicle wheel support member 10 together is positioned in the rear of the axis 46c of the tie rod 46.

The manner in which the flutter and harshness are reduced in the embodiment constructed as above is now described.

In the case of flutter, the force acting toward the rear of the vehicle on the vehicle wheel is small compared with that in the case of harshness, and therefore the force acting on the outer tube 54 in the vehicle lateral direction relative to the inner tube 52 caused by the force on the vehicle wheel has a relatively small value. In FIG. 1, if as a result of a force applied toward the rear of the vehicle on the vehicle wheel a force F is applied toward the rear of the vehicle on the center P of the ball joint 28, then as shown in FIG. 1 force Fq and Fr respectively will act on the center Q of the front elastic linkage bearing 22 and the center R of the rear elastic linkage bearing 24. The outer tube 54 will therefore be urged in the vehicle lateral direction relative to inner tube 52 by the vehicle lateral component Frx of the force Fr. The component Frx is smaller than f1, and therefore the end of the engaging lug will not be separated from the inner tube and the spring constant of the rear elastic linkage bearing 24 will thereby be maintained at a higher value than the spring constant of the front elastic linkage bearing 22.

Therefore the instantonous pivoting center O1 of the control arm 12 and the vehicle wheel support member 10 together is positioned for example as shown in FIG. 1. Therefore the displacement motion of the center L of the ball joint 44 as a result of pivoting of the control arm 12 and the vehicle wheel support member 10 together toward the rear of the vehicle is for example as shown by D1 in FIG. 1. Also, when a force acts on the vehicle wheel 14 toward the rear of the vehicle the vehicle wheel support member 10 moves laterally about the center P, and as a result of this lateral movement the center L of the ball joint 44 is displaced as shown by D2 in FIG. 1. Since these displacements may be considered as though there were no phase difference, a total displacement D which is the sum of the displacements D1 and D2 of the center L is produced. Because the angle which this displacement D makes with the axis 46c is larger than in the case where the instantaneous center O1 is positioned toward the vehicle front from the position shown in FIG. 1, the component of this displacement in the direction of the axis 46c is reduced and thereby the axial displacement of the tie rod 46 is reduced and as a result flutter is reduced.

In the case of harshness, the force acting on the vehicle wheel in the vehicle longitudinal direction is large compared with the case of flutter, and therefore the resulting force acting on the outer tube 54 in the vehicle lateral direction relative to the inner tube 52 has a larger value. In FIG. 2, if as a result of a force applied toward the rear of the vehicle on the vehicle wheel a force F applied toward the rear of the vehicle on the center P of the ball joint 28, then as shown in FIG. 2 forces Fq and Fr respectively will act on the center Q of the front elastic linkage bearing 22 and the center R of the rear elastic linkage bearing 24. The outer tube 54 will therefore be urged in the vehicle lateral direction relative to the inner tube 52 by the vehicle lateral component Frx of the force Fr. The component Frx is larger than f1 so the end of the engaging lug is detached from the inner tube and the spring constant of the rear elastic linkage bearing 24 will thereby be made smaller than the spring constant of the front elastic linkage bearing 22. Therefore the instantaneous pivoting center O1 of the control arm 12 and the vehicle wheel support member 10 together is positioned for example as shown in FIG. 2; compared with the case in which the instantaneous center O1 is to the rear of the position shown in FIG. 2 the load applied to the vehicle wheel in the vehicle longitudinal direction may be more easily absorbed by elastic deformation laterally of the rear elastic linkage bearing as a result of which harshness is effectively reduced.

In this embodiment, the enaging lug 66 may be constructed entirely from an elastic material of relatively high spring constant, or the engaging lug may be constructed so that it is entirely rigid, but in the latter case when a force is applied to the vehicle wheel toward the front and the force f resulting therefrom is in the range not exceeding the certain value f1, the outer tube will not be displaced forward relative to the inner tube, and the instantaneous center O1 of the control arm 12 and the vehicle wheel support member 10 together will be positioned at the center R of the elastic linkage bearing 24. Therefore according to this embodiment, even in the case where the inclination of the tie rod 46 looking from the first end 46a from the other end 46b toward the rear of the vehicle is a relatively large angle, flutter can be effectively reduced.

Figure 6:
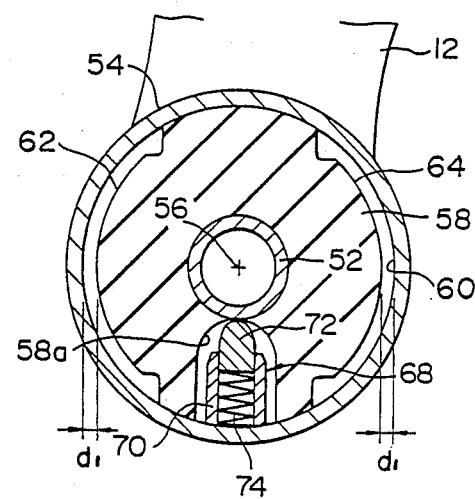
FIG. 6 is an enlarged plan sectional view similar to FIG. 3 showing another embodiment of a rear elastic linkage bearing.

FIG. 6 is a plan sectional diagram similar to FIG. 3 showing another embodiment of the rear elastic linkage bearing, and FIG. 7 is a schematic graph similar to FIG. 5 showing the spring characteristics in the vehicle lateral direction of the elastic linkage bearing shown in FIG. 6. In FIG. 6, portions substantially the same as shown in FIG. 3 are indicated by the same reference numerals in FIG. 3.

In this embodiment, within a recess 58a in the rubber elastic body 58, an engaging device 68 is provided which fulfills the same function as the engaging lug 56 shown in FIG. 3 and FIG. 4. The engaging device 68 comprises a guide tube 70 which is substantially rigid, is fixed to the inner surface of the outer tube 54, and extends toward the inner tube as far as a position spaced apart from the inner tube 52, a slider 72 which is inserted slidably into the guide tube and has a round end which engages with the outer surface of the inner tube 52, and a compression coil spring 74 which is disposed within the guide tube and between the slider 72 and the outer tube so as to urge the slider toward the inner tube.

In other respects this embodiment is constructed as the embodiment shown in FIG. 3 and FIG. 4, and the compression coil spring 74 may be replaced by another spring means such as a rubber elastic body.

In this embodiment, even if a relative force acts between the inner tube and outer tube in the vehicle lateral direction, the engaging device 68 does not undergo elastic deformation, and therefore while the force f acting on the outer tube in the vehicle lateral direction relative to the inner tube is in the range not exceeding a certain value f1, the end of the slider 72 and the inner tube will be maintained in an abutting state by the static friction force acting between them so that no relative displacement will occur, and thus there will be no relative displacement in the vehicle lateral direction of the outer tube with respect to the inner tube. When the force f exceeds the certain value f1, the force urging the slider 72 to move in the vehicle lateral direction will overcome the static frictional force acting between the end of the slider and the inner tube, and the slider 72 will be separated from the inner tube, and the portions of the rubber elastic body 58 in the vehicle longitudinal direction will undergo elastic deformation (principally shear deformation) so that a relatively small spring constant will be produced and the relative displacement of the outer tube with respect to the inner tube will become large.

Again, in this embodiment, if the force f further increases, the outer surface 62 or 64 of the rubber elastic body 58 contacts the inner surface of the outer tube and the portion of the rubber elastic body in the vehicle right or left direction is compressed, so that a relatively large spring constant is produced, and the relative displacement of the outer tube with respect to the inner tube is decreased.

Figure 8:
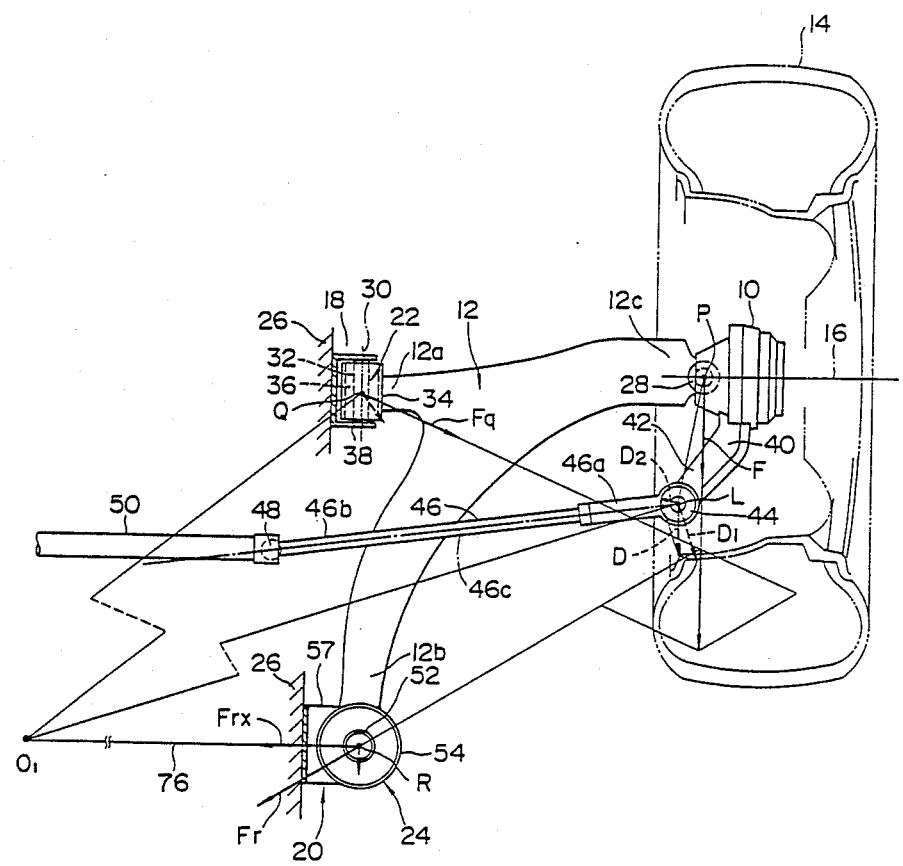
FIG. 8 is an explanatory plan view showing the forces acting on various constituents and the movements of various constituents in a case where flutter could occur in a front suspension using the rear elastic linkage bearing shown in FIG. 6.

Furthermore, in this embodiment, when the force f is in the range not exceeding the certain value f1, there is no relative movement in the vehicle lateral direction of the outer tube with respect to the inner tube as a result of which as shown in FIG. 8, the instantaneous center O1 of pivoting of the control arm 12 and the vehicle wheel support member 10 together in the vehicle longitudinal direction is on a straight line 76 which passes through the center of the rear elastic linkage bearing 24 and is perpendicular to the axis 30. Therefore, compared with the case of the embodiment shown in FIG. 1 to FIG. 5 the distance between the instantaneous center O1 and the axis 46c of the tie rod 46 is increased, and the direction of the total displacement D of the center L of the ball joint 44, which is the sum of the displacement D1 about the instantaneous center O1 and the displacement D2 about the center P of the ball joint 28, even more closely approximates to being perpendicular to the axis 46c of the tie rod 46, and thereby compared with the case of the embodiment shown in FIG. 1 to FIG. 5 flutter can be even more effectively reduced.

In the case of harshness, the instantaneous center O1 is positioned in the same position as the position shown in FIG. 2, so that as in the case of the embodiment shown in FIG. 1 to FIG. 5 harshness is effectively reduced. Furthermore, in this embodiment the guide tube 70 may be constructed from an elastic material which is able to undergo bending deformation, and in this case even when the force f is in the range not exceeding the certain value f1, a relative displacement of the outer tube with respect to the inner tube in the vehicle lateral direction will be able to occur, so that the spring characteristics of the elastic linkage bearing will be similar to the spring characteristics shown in FIG. 5.

Figure 9:
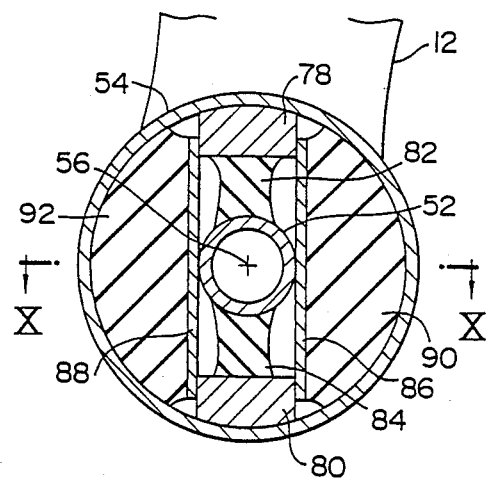
FIG. 9 is an enlarged plan sectional view similar to FIG. 3 showing another embodiment of the rear elastic linkage bearing.
Figure 10:
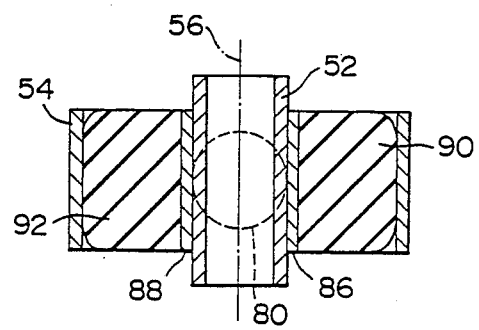
FIG. 10 is a sectional view along the line X—X of FIG. 9.

FIG. 9 is an enlarged plan sectional view showing another embodiment of the rear elastic linkage bearing, and FIG. 10 is a sectional view along line X—X of FIG. 9. In FIG. 9 and FIG. 10, portions which are substantially the same as portions shown in FIG. 3 and FIG. 4 are indicated by the same reference numerals as in FIG. 3 and FIG. 4.

In this embodiment, substantially rigid stoppers 78 and 80 are fixed to the inner surface of the outer tube 54 in positions opposing the inner tube 52 in the vehicle longitudinal direction. The maximum dimension of these stoppers in the vehicle lateral direction is the same as the outer diameter of the inner tube or very slightly larger, and in the embodiment shown in the drawing these stoppers are cylindrical with a radius very slightly greater than the outside radius of the inner tube. Between these stoppers and the inner tube are interposed throatshaped rubber elastic bodies 82 and 84, and these are attached by adhesive at both ends to the inner tube and the end surface of the corresponding stopper. On both sides in the vehicle lateral direction of the inner tube, these stoppers and these rubber elastic bodies are disposed two substantially rigid plates 86 and 88. The plates 86 and 88 are very slightly longer than the distance between the stoppers 78 and 80, so that the plates can engage with the stoppers at both ends. Between the plates 86 and 88 and the outer tube are disposed rubber elastic bodies 90 and 92. These rubber elastic bodies are fixed by adhesive to the corresponding plates, and are preloaded so as to apply a force f1 overall to the corresponding plate against the stopper. Thus in the standard position, in other words when no force in the vehicle lateral direction is acting between the inner tube and the outer tube, the inner tube is abutted such as to receive no reaction from the plates.

In this embodiment, when the force f acting on the outer tube in the vehicle lateral direction relative to the inner tube is in the range not exceeding the certain value f1, the force f will be smaller than the preload applied to the stoppers 78 and 80 through the plates 86 and 88 by the rubber elastic bodies 90 and 92, as a result of which there will be no relative displacement of the outer tube with respect to the inner tube. When the force f is in the range exceeding f1, the force with which the inner tube 52 drives the plates 86 and 88 toward the outer tube will exceed the preloading applied by the rubber elastic bodies 90 and 92, and there will be a displacement in the vehicle lateral direction of the inner tube 52 relative to the outer tube 54, and the rubber elastic bodies 90 and 92 will be compressed, whereby a relatively small spring constant will be produced, and the relative displacement of the inner tube relative to the outer tube will be increased.

Therefore the spring characteristics in the vehicle lateral direction of this embodiment are similar to the characteristics shown in FIG. 7, and in the same manner in the embodiment shown in FIG. 6, flutter and harshness can be effectively reduced.

Furthermore, in this embodiment, the rubber elastic bodies 82 and 84 are mutually independent of the rubber elastic bodies 90 and 92, as a result of which the spring constants of the elastic linkage bearing in the vehicle lateral direction and in the vehicle longitudinal direction may be determined independently.

Figure 11:
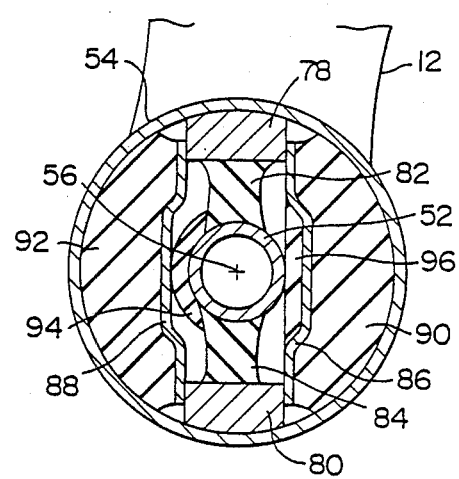
FIG. 11 is an explanatory plan sectional view showing two amended examples of the embodiment shown in FIG. 9 and FIG. 10.

In this embodiment, it is possible to make the spring characteristics in the vehicle lateral direction of the elastic linkage bearing the same as the characteristics shown in FIG. 5 either, as shown in the left half of FIG. 11, by fastening to the outer surface of the inner tube 52 at least on the those portions in the vehicle lateral direction a rubber elastic body 94 of spring constant higher than the rubber elastic bodies 90 and 92, and offsetting the plates 86 and 88 uniformly toward the outer tuber excluding portions at both ends by a distance equal to the thickness of the rubber elastic body, or, as shown in the right half of FIG. 11, by offsetting uniformly the plates 86 and 88 excepting the end portions toward the outer tube 54 and attaching to the offset portion by adhesive a rubber elastic body 96 of spring constant higher than the rubber elastic bodies 90 and 92 and of thickness equal to the amount of the offset; thereby a correction may be made so that the reduction of flutter and harshness is carried out in the same way as in the embodiment shown in FIG. 1 to FIG. 4.

Figure 12:
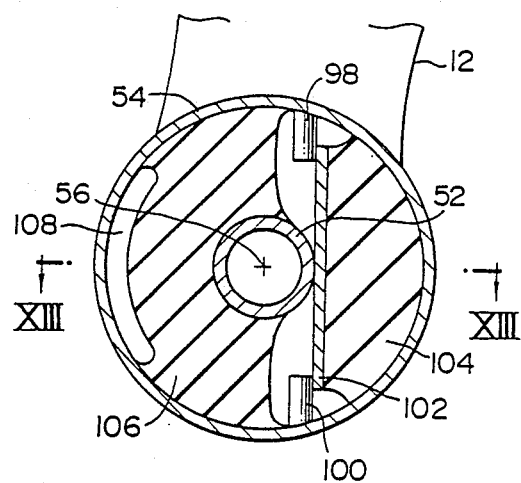
FIG. 12 is an enlarged plan sectional view similar to FIG. 3 showing yet another embodiment of the rear elastic linkage bearing.
Figure 13:
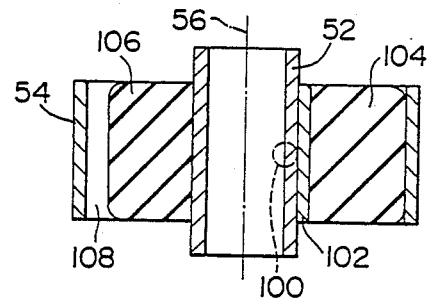
FIG. 13 is a sectional view along the line XIII—XIII in FIG. 12.

FIG. 12 is a plan sectional diagram similar to FIG. 3 showing another embodiment of the rear elastic linkage bearing, and FIG. 13 is a section along the line XIII-XIII in FIG. 12; FIG. 14 is a schematic graph showing the vehicle lateral spring characteristics in the free state of the elastic linkage bearing shown in FIG. 12 and FIG. 13. It should be noted that in FIG. 12 and FIG. 13 portions which are substantially the same as portions shown in FIG. 3 and FIG. 4 are indicated by the same reference numerals as shown in FIG. 3 and FIG. 4.

In this embodiment, stoppers 98 and 100 which are substantially rigid are fixed to the inner surface of the outer tube 54 in positions opposing the inner tube 52 substantially in the vehicle longitudinal direction. On the right hand side of these stoppers in the drawing is disposed a substantially rigid plate 102. This plate is slightly longer than the distance between the ends of the stoppers 98 and 100, so that it can engage at both ends with the stoppers 98 and 100. Between the plate 102 and the outer tube 54 is interposed a rubber elastic body 104, which is fixed by adhesive to the plate and the outer tube. The rubber elastic body 104 exerts a total force 2f1 to the left in the diagram on the stoppers 98 and 100 through the plate 102. Substantially the left hand portion in the drawing of the space between the inner tube 52 and the outer tube 54 is filled with a rubber elastic body 106, and this is fixed with adhesive to the inner tube and outer tube. In the embodiment shown in the drawing, the rubber elastic body 106 is provided on a left hand side portion in the drawing wth a cavity 108 extending in an arc along the outer tube. In the free state this rubber elastic body 106 is substantially not compressed, and the inner tube 54 is abutting the plate 102 with substantially no reaction from it.

The elastic linkage bearing of this embodiment is used in a state where a preloading force f1 to the left as seen in FIG. 12 is acting on the outer tube 54 relative to the inner tube 52. Thus when the preloading is applied to the outer tube, the preloading applied by the rubber elastic body 104 to the stoppers 98 and 100 is f1 and the rubber elastic bodies 104 and 106 are mutually subject to a preloading force f1 through the plate 102 and the inner tube 52.

Therefore when the force f acting to the left in the drawing on the outer tube with respect to the inner tube is in the range not exceeding f1, the force f cannot overcome the preloading of the rubber elastic body 104, so that the outer tube is not displaced relative to the inner tube; again, when the force f acting to the right on the outer tube with respect to the inner tube is not more than a certain value f1, it is not able to overcome the preloading to the left applied to the outer tube so that in this case also the outer tube is not displaced relative to the inner tube. When the force f is in the range exceeding the certain value f1, the rubber elastic body 104 or the rubber elastic body 106 becomes compressed, and thus a relatively low spring constant is produced, and the relative displacement of the outer tube with respect to the inner tube is increased. Therefore, in this embodiment, the spring characteristics in the vehicle lateral direction are similar to the characteristics shown in FIG. 7 and according to this embodiment flutter and harshness can be effectively reduced in the same way as the embodiment shown in FIG. 6.

Figure 15:
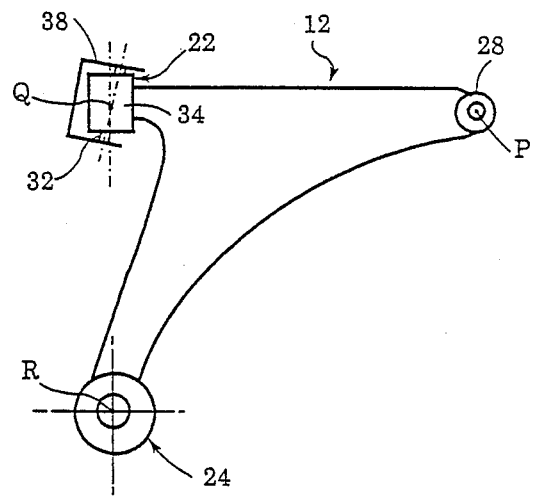
FIG. 15 is an explanatory diagram showing an example of preloading being applied to the outer tube of the elastic linkage bearing shown in FIG. 12 and FIG. 13.

The preloading to the left by the force f1 of the outer tube 54 in this embodiment may also be achieved for example as shown schematically in FIG. 15 by providing the bracket 38 of the coupling portion 18 at an angle, or by using as the rubber elastic body of the front elastic linkage bearing 22 a tubular rubber elastic body such that the axes of the outer peripheral surface and the inner peripheral surface intersect, whereby as seen from above the vehicle a force is applied to the control arm 12 in a clockwise direction about the center Q.

The present invention has been described above with reference to a number of embodiments, but the present invention is not restricted to these embodiments, and it will be those clear to those skilled in the relevant art that various embodiments are possible within the scope of the present invention. For example, each of the above embodiments the outer tube is coupled to the control arm and the inner tube is coupled to the vehicle body, but the inner tube may be coupled to the control arm and the outer tube coupled to the vehicle body, or particularly in the embodiment shown in FIG. and FIG. 4 and the embodiment shown in FIG. 6, the respective lugs or engaging devices may be provided at a front position with respect to the inner tube, or may be provided at positions in both front and rear. Furthermore, in the embodiment shown in FIG. 12 and FIG. 13, the construction of the elastic linkage bearing may be reversed in the vehicle lateral direction.

We claim:

1. A front suspension for a vehicle, including a vehicle wheel support member (10) supporting rotatably a vehicle wheel (14), a control arm (12) connected with a vehicle body at two inboard end portions (12a, 12b) thereof spaced apart substantially in a longitudinal direction of the vehicle to be vertically pivotable therearound relative to the vehicle body and connected with said wheel support member at an outboard end portion thereof to be horizontally pivotable therearound relative to said wheel support member, a front and a rear elastic linkage bearing (18, 24) incorporated in the connecting portions between said two inboard end portions of said control arm and said vehicle body, a knuckle arm (42) integrally connected at one end thereof with said vehicle wheel support member and extending rearwardly of the vehicle therefrom to a free end portion thereof, and a tie rod (46) pivotally connected at one end thereof with said free end portion of said knuckle arm, characterized in that said rear elastic linkage bearing (24) has non-linear spring characteristics such as to exhibit a first spring constant with respect to force acting thereto in a vehicle lateral direction at a value not exceeding a certain value (f1) and a second spring constant which is lower than said first spring constant with respect to the force exceeding said certain value, and in that said first spring constant of said rear elastic linkage bearing (24) and the spring constant of said front elastic linkage bearing (18) with respect to force acting thereto in the vehicle lateral direction are set such that the instantaneous center of pivoting (O1) of said vehicle wheel support member and said control arm together in the vehicle longitudinal direction is positioned to the rear of the axis (46c) of said tie rod (46).

2. A vehicle front suspension according to claim 1, wherein said first spring constant of said rear elastic linkage bearing (24) is substantially the same or higher than the spring constant in the vehicle lateral direction of said front elastic linkage bearing (18).

3. A vehicle front suspension according to claim 1, wherein said first spring constant of said rear elastic linkage bearing (24) is substantially infinitely large.

4. A vehicle front suspension according to claim 1, wherein said rear elastic linkage bearing (24) comprises an outer tube member (54), an inner tube member (52) disposed at the inside of said outer tube member to be substantially coaxial thereto, a subtantially annular rubber elastic body (58) disposed between said outer and inner tube members with lateral clearances being left adjacent laterally opposite wall portions of said outer tube member aligned in the lateral direction of the vehicle, said elastic body being formed with a radial recess (58a) of substantially full radial depth thereof and aligned in the longitudinal direction of the vehicle, and a lug (66) disposed in said recess of said elastic body to extend in the longitudinal direction of the vehicle with a radially outside end thereof being firmly fixed to said outer tube member and a radially inside end thereof being elastically frictionally abutted against said inner tube member.

5. A vehicle front suspension according to claim 4, wherein said lug (66) comprises a rigid root portion (66a) fixed to said outer tube member (54), a rigid end portion (66b) frictionally abutting said inner tube member (52), and a central rubber elastic portion (66c) disposed between and connecting together said root portion and said end portion.

6. A vehicle front suspension according to claim 4, wherein said lug (66) comprises a guide tube member (70) fixed to said outer tube member (54), a slider (72) partially slidably received in said guide tube member and frictionally engaging said inner tube member (52) at an end thereof, and a compression coil spring (74) disposed in said guide tube member and elastically driving said slider out of said guide tube member toward said inner tube member.

7. A vehicle front suspension according to claim 1, wherein said rear elastic linkage bearing (24) comprises an outer tube member (54), an inner tube member (52) disposed at the inside of said outer tube member to be substantially coaxial thereto, a pair of stoppers (78, 80) disposed in an annular space left between said outer and inner tube members adjacent and fixed to said outer tube member as aligned substantially in the longitudinal direction of the vehicle, a pair of plates (86, 88) abutting at laterally opposite sides of said stoppers as well as of said inner tube member (52), a pair of rubber elastic bodies (90, 92) each being disposed between each of said plates and a laterally opposing portion of said outer tube member (54), at least one (90) of said rubber elastic bodies located on the outboard side of said inner tube member (52) being elastically precompressed in the lateral direction of the vehicle, and a pair of rubber elastic bodies (82, 84) each being disposed between each of said stoppers (78, 80) and a longitudinally opposing portion of said inner tube member (52).

8. A vehicle front suspension according to claim 7, wherein a rubber elastic layer means (94, 96) is interposed between said plate (86, 88) and said inner tube member (52).

9. A vehicle front suspension according to claim 1, wherein said rear elastic linkage bearing (24) comprises an outer tube member (54), an inner tube member (52) disposed at the inside of said outer tube member, a pair of stoppers (98, 100) disposed in an annular space left between said outer and inner tube members adjacent and fixed to said outer tube member as aligned substantially in the longitudinal direction of the vehicle, a plates (102) abutting at a laterally outboard side of said stoppers as well as of said inner tube member (52), a first rubber elastic body (104) disposed between said plate (102) and a laterally opposing portion of said outer tube member (54) and precompressed in the lateral direction of the vehicle, and a second rubber elastic body (106) disposed in a half portion of an annular space left between said outer tube member (54) and said inner tube member (52) laterally opposing said first rubber elastic body (104).

10. A vehicle front suspension according to claim 9, wherein a space (108) is left between said second rubber elastic body (106) and a laterally opposing portion of said outer tube member (54).

* * * * *